United States Patent
Chakkera et al.

(10) Patent No.: US 9,650,993 B2
(45) Date of Patent: May 16, 2017

(54) ROTARY HYDRAULIC MOTOR DRIVEN HYBRID THRUST REVERSER ACTUATION SYSTEM WITH END-OF-STROKE SNUBBING

(71) Applicant: HONEYWELL INTERNATIONAL INC., Morristown, NJ (US)

(72) Inventors: Kevin K. Chakkera, Chandler, AZ (US); Ron Vaughan, Gilbert, AZ (US); Steve Abel, Chandler, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 643 days.

(21) Appl. No.: 14/279,016

(22) Filed: May 15, 2014

(65) Prior Publication Data

US 2015/0300294 A1 Oct. 22, 2015

Related U.S. Application Data (60) Provisional application No. 61/894,467, filed on Oct. 23, 2013.

(51) Int. Cl.
*F02K 1/76* (2006.01)
*F01D 17/26* (2006.01)
(Continued)

(52) U.S. Cl.
CPC .............. *F02K 1/763* (2013.01); *F01D 17/26* (2013.01); *F02K 1/72* (2013.01); *F02K 1/74* (2013.01);
(Continued)

(58) Field of Classification Search
CPC ..... F02K 1/72; F02K 1/74; F02K 1/76; F02K 1/763; F05D 2270/64
See application file for complete search history.

(56) References Cited

U.S. PATENT DOCUMENTS 4,076,225 A * 2/1978 Houghton ................. F16F 9/48
188/285
7,341,236 B2 * 3/2008 Stephenson ......... F16K 31/0689
251/30.03
(Continued)

FOREIGN PATENT DOCUMENTS

| EP | 1978233 A2 | 10/2008 |
| EP | 2602456 A2 | 6/2013 |
| GB | 2408725 A | 6/2005 |

OTHER PUBLICATIONS

RDP Group "How it Works—Dc LVDT", 2006.*
EP Extended Search Report for Application No. 14186288.8 dated Mar. 5, 2015.

*Primary Examiner* — Phutthiwat Wongwian
*Assistant Examiner* — William Breazeal
(74) *Attorney, Agent, or Firm* — Lorenz & Kopf, LLP (57) ABSTRACT

An aircraft thrust reverser actuation system includes a plurality of actuator assemblies that are each configured, upon receipt of a drive torque, to move to a position. The rotary hydraulic motor is coupled to each of the actuator assemblies and is configured, upon receipt of hydraulic fluid, to rotate and supply the drive torque to each of the actuator assemblies. The control valve is in fluid communication with the rotary hydraulic motor and is configured, upon receipt of electrical current, to move to a valve position based on the magnitude of the received electrical current, to thereby control the direction and flow of hydraulic fluid to the hydraulic motor. The valve control is configured, upon receipt of thrust reverser commands, to supply the electrical current to the control valve and selectively vary the magnitude of the electrical current based on the positions of the actuator assemblies.

11 Claims, 4 Drawing Sheets

(51) Int. Cl.
 *F02K 1/72* (2006.01)
 *F02K 1/74* (2006.01)

(52) U.S. Cl.
 CPC ............... *F02K 1/76* (2013.01); *F02K 1/766* (2013.01); *F05D 2250/411* (2013.01); *F05D 2260/406* (2013.01); *F05D 2270/64* (2013.01); *F05D 2270/66* (2013.01)

(56) References Cited

U.S. PATENT DOCUMENTS

| | | |
|---|---|---|
| 7,513,101 B2 | 4/2009 | Eschborn et al. |
| 8,632,033 B2 | 1/2014 | Somerfield et al. |
| 2009/0320444 A1 | 12/2009 | Nouhaud |
| 2009/0326783 A1* | 12/2009 | Calmelat ................... F02K 1/76 701/100 |
| 2010/0168982 A1 | 7/2010 | Maalioune |
| 2012/0090311 A1 | 4/2012 | Le Coq et al. |
| 2013/0161414 A1 | 6/2013 | Ramlaoui et al. |

\* cited by examiner

ROTARY HYDRAULIC MOTOR DRIVEN HYBRID THRUST REVERSER ACTUATION SYSTEM WITH END-OF-STROKE SNUBBING

CROSS-REFERENCE TO RELATED APPLICATION

This application claims the benefit of U.S. Provisional Application No. 61/894,467, filed Oct. 23, 2013.

TECHNICAL FIELD

The present invention generally relates to thrust reverser actuation systems, and more particularly relates to a thrust reverser actuation system that is driven by a rotary hydraulic motor.

BACKGROUND

When a jet-powered aircraft lands, the landing gear brakes and aerodynamic drag (e.g., flaps, spoilers, etc.) of the aircraft may not, in certain situations, be sufficient to slow the aircraft down in the required amount of runway distance. Thus, jet engines on most aircraft include thrust reversers to enhance the braking of the aircraft. When deployed, a thrust reverser redirects the rearward thrust of the jet engine to a generally or partially forward direction to decelerate the aircraft. Because at least some of the jet thrust is directed forward, the jet thrust also slows down the aircraft upon landing.

Various thrust reverser system designs are commonly known, and the particular design utilized depends, at least in part, on the engine manufacturer, the engine configuration, and the propulsion technology being used. Regardless of the specific thrust reverse system used, each includes thrust reverser movable components that are selectively deployed to enhance the braking of the aircraft, and thereby shorten the stopping distance during landing and reduce the burden on landing gear brakes. During the landing process, the thrust reverser movable components may be deployed to assist in slowing the aircraft. Thereafter, when the thrust reversers are no longer needed, the thrust reverser movable components are returned to their original, or stowed, position.

The thrust reverser movable components are moved between the stowed and deployed positions by actuators. Power to drive the actuators may come from one or more drive units, which may be electric, pneumatic, or hydraulic drive, depending on the system design. A drive train that includes one or more drive shafts, such as flexible rotating shafts, may interconnect the actuators and the one or more drive mechanisms to transmit the drive mechanism drive force to the thrust reverser movable components and/or to synchronize the reverser components.

Hydraulically-driven thrust reverser systems have been historically used in aircraft because of the robustness of hydraulic components and the abundant availability of hydraulic fluid onboard most aircraft. Unfortunately, these systems also suffer drawbacks. For example, these systems may leak, which can cause environmental and other (e.g., fire zone) concerns. These systems may require significant flow and/or require hydraulic fluid to be present in the actuators or other components, which can increase weight.

Hence, there is a need for an aircraft thrust reverser actuation system that includes the robust features of a hydraulically-driven system, but does not suffer the environmental and weight issues associated with presently known systems. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft thrust reverser actuation system includes a plurality of actuator assemblies, a rotary hydraulic motor, a control valve, and a valve control. Each actuator assembly is coupled to receive a drive torque and is configured, upon receipt of the drive torque, to move to a position. The rotary hydraulic motor is coupled to each of the actuator assemblies and is adapted to selectively receive hydraulic fluid at a fluid flow rate and differential pressure. The rotary hydraulic motor is configured, upon receipt of the hydraulic fluid, to rotate and supply the drive torque to each of the actuator assemblies. The control valve is in fluid communication with the rotary hydraulic motor and is adapted to receive electrical current at a magnitude. The control valve is configured, upon receipt of the electrical current, to move to a valve position based on the magnitude of the received electrical current, to thereby control the direction and flow of hydraulic fluid to the hydraulic motor. The valve control is coupled to selectively receive thrust reverser commands and is configured, upon receipt of the thrust reverser commands, to supply the electrical current to the control valve and selectively vary the magnitude of the electrical current based on the positions of the actuator assemblies.

In another embodiment, an aircraft thrust reverser actuation system includes a plurality of non-hydraulic actuator assemblies, a rotary hydraulic motor, a control valve, and a valve control. Each actuator assembly is coupled to receive a drive torque and is configured, upon receipt of the drive torque, to move to between a fully stowed and a fully deployed position. The rotary hydraulic motor is coupled to each of the actuator assemblies and is adapted to selectively receive hydraulic fluid at a fluid flow rate and differential pressure. The rotary hydraulic motor is configured, upon receipt of the hydraulic fluid, to rotate and supply the drive torque to each of the actuator assemblies. The control valve is in fluid communication with the rotary hydraulic motor and is adapted to receive electrical current at a magnitude. The control valve is configured, upon receipt of the electrical current, to move to a valve position based on the magnitude of the received electrical current, to thereby control the direction and flow of hydraulic fluid to the hydraulic motor. The valve control is coupled to selectively receive thrust reverser commands and is configured, upon receipt of the thrust reverser commands, to supply the electrical current to the control valve and to vary the magnitude of the electrical current when the actuator assemblies are: (i) translating toward the fully deployed position and are between a first snubbing position and the fully deployed position, and (ii) translating toward the fully stowed position and are between a second snubbing position and the fully stowed position.

In yet another embodiment, an aircraft thrust reverser system includes a plurality of non-hydraulic actuator assemblies, a rotary hydraulic motor, a control valve, a valve control, and a power splitter circuit. Each actuator assembly is coupled to receive a drive torque and is configured, upon receipt of the drive torque, to move to between a fully stowed and a fully deployed position. The rotary hydraulic motor is coupled to each of the actuator assemblies and is adapted to selectively receive hydraulic fluid at a fluid flow rate and differential pressure. The rotary hydraulic motor is configured, upon receipt of the hydraulic fluid, to rotate and supply the drive torque to each of the actuator assemblies. The control valve is in fluid communication with the rotary hydraulic motor and is adapted to receive electrical current at a magnitude. The control valve is configured, upon receipt of the electrical current, to move to a valve position based on the magnitude of the received electrical current, to thereby control the direction and flow of hydraulic fluid to the hydraulic motor. The valve control is coupled to selectively receive thrust reverser commands and is configured, upon receipt of the thrust reverser commands, to supply the electrical current to the control valve. The power splitter circuit is coupled to selectively receive thrust reverser commands and is configured, upon receipt of the thrust reverser commands, to selectively supply regulated DC voltage to the valve control. The valve control varies the magnitude of the electrical current linearly by decreasing the electrical current from a predetermined maximum magnitude to zero when the actuator assemblies are: (i) translating toward the fully deployed position and are between a first snubbing position and the fully deployed position, and (ii) translating toward the fully stowed position and are between a second snubbing position and the fully stowed position.

Furthermore, other desirable features and characteristics of the thrust reverser actuation system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
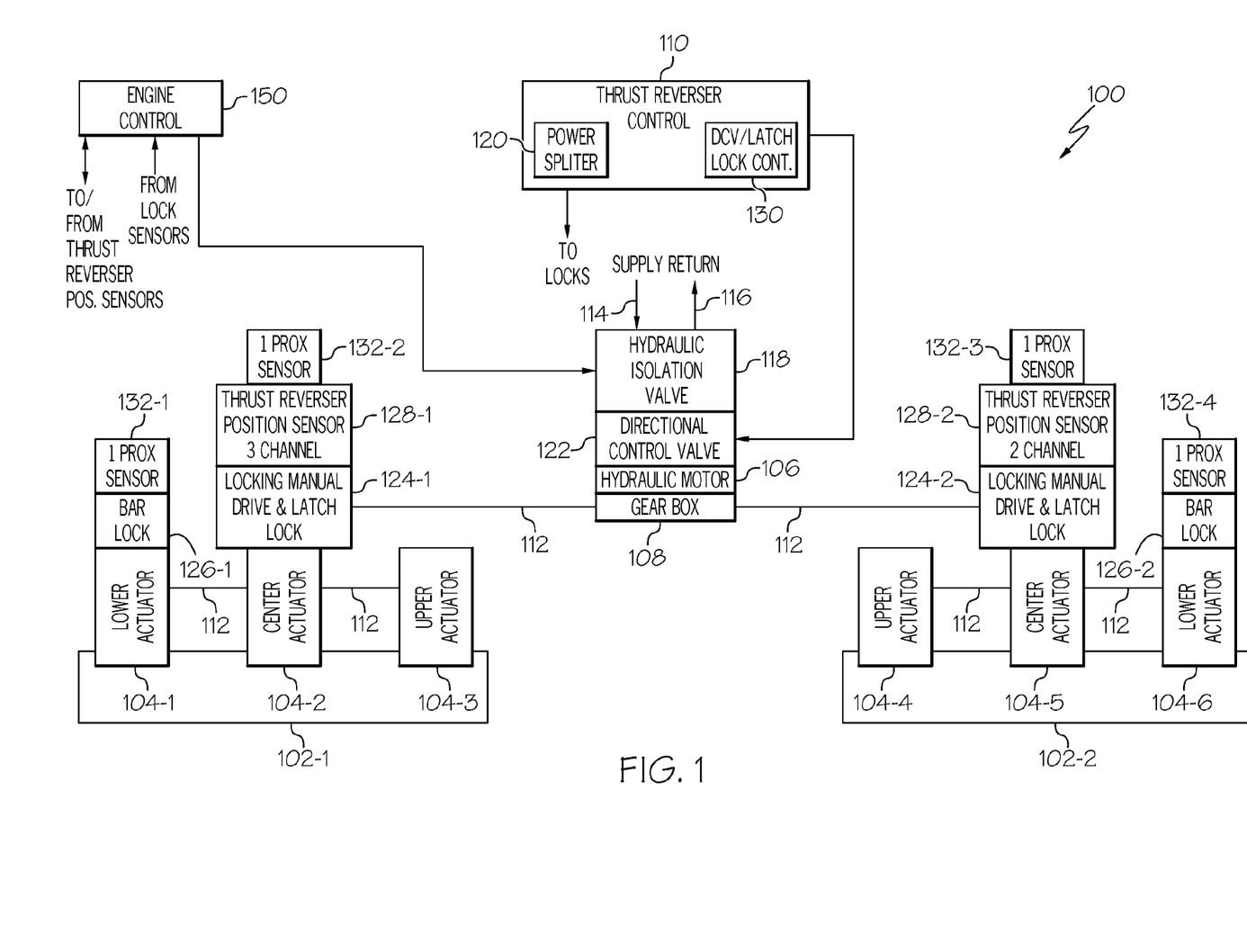
FIG. 1 depicts a functional block diagram of an exemplary rotary hydro-mechanical thrust reverser actuation system for a single jet engine.

Referring now to FIG. 1, a functional block diagram of an exemplary rotary hydro-mechanical thrust reverser actuation system 100 for a single jet engine is depicted. The depicted system 100 includes a plurality of thrust reverser movable components 102, a plurality of actuator assemblies 104, a rotary hydraulic motor 106, and a thrust reverser control 110. The thrust reverser movable components 102 are movable between a stowed position and a deployed position. The thrust reverser movable components 102 may be implemented as any one of numerous types of components, depending upon the particular type of thrust reverser actuation system being implemented. For example, the thrust reverser movable components 102 may be implemented as transcowls if the thrust reverser actuation system 100 is a cascade-type thrust reverser system or as a plurality of doors if the thrust reverser actuation system 100 is a target-type thrust reverser system or pivot door thrust reverser system. Moreover, while two thrust reverser movable components 102 (102-1, 102-2) are depicted, it will be appreciated that the system 100 may be implemented with more than this number.

The actuator assemblies 104 are individually coupled to the thrust reverser movable components 102. In the depicted embodiment, the system 100 includes six actuator assemblies 104-1, 104-2, 104-3, 104-4, 104-5, 104-6, with three of the actuator assemblies 104-1, 104-2, 104-3 being coupled to one of the thrust reverser movable components 102-1, and the other three actuator assemblies 104-4, 104-5, 104-6 being coupled to the other thrust reverser movable component 102-2. It is noted that the actuator assemblies 104 may be implemented using any one of numerous types of actuator assemblies now known or developed in the future. Some non-limiting examples of suitable actuator assemblies include ball screw actuators, roller screw actuators, and piston-type actuators, just to name a few. It is additionally noted that the number, arrangement, and configuration (e.g., with or without locks, position sensors, etc.) of the actuator assemblies 104 is not limited to the arrangement depicted in FIG. 1, but could include other numbers, arrangements, and configurations of actuator assemblies 104.

The rotary hydraulic motor 106 is coupled to each of the thrust reverser movable components 102. More specifically, the rotary hydraulic motor 106 is separately coupled, via a gear box 108 and a pair of drive shafts 112, to one of the actuator assemblies 104 (e.g., 104-2, 104-5) associated with each thrust reverser movable component 102. Moreover, the remaining actuator assemblies 104 (104-1, 104-3 and 104-4, 104-6) associated with each thrust reverser movable component 102 are interconnected with, and driven by the motor-driven actuators 104-2, 104-5 via drive shafts 112. The drive shafts 112 are preferably implemented as flexible shafts. Using flexible shafts in this configuration preferably ensures that the actuator assemblies 104 and thrust reverser movable components 102 move in a substantially synchronized manner.

The rotary hydraulic motor 106 is coupled to selectively receive hydraulic fluid from, and return hydraulic fluid to, a non-illustrated hydraulic fluid source. In the depicted embodiment, the hydraulic fluid is supplied from and returned to the non-illustrated hydraulic source via a hydraulic fluid supply line 114 and a hydraulic fluid return line 116, respectively. The rotary hydraulic motor 106 is configured, upon receipt of hydraulic fluid, to supply a drive force, via the gear box 108, drive shafts 112, and actuator assemblies 104, to move the thrust reverser movable components 102 in either a deploy direction or a stow direction. The rotational direction and speed of the rotary hydraulic motor 106 motor, and hence the movement direction and speed of the thrust reverser movable components 102, depends upon the direction and the pressure (or flow) of the hydraulic fluid supplied to the rotary hydraulic motor 106. The direction and pressure (or flow) of the hydraulic fluid supplied to the rotary hydraulic motor 106 is controlled via a directional control valve (DCV) 122. A hydraulic isolation valve 118 interfaces with the hydraulic fluid supply 114 and return 116 lines and controls the availability of the hydraulic power source to the DCV 122. As will be described in more detail further below, the DCV 122 is responsive to commands supplied from the thrust reverser control 110 to control the direction and flow of hydraulic fluid to the rotary hydraulic motor 106.

Before describing the thrust reverser control 110 and its associated functionality, it is seen in FIG. 1 that the depicted system 100 additionally includes various locks and sensors. In particular, the system 100 includes two latch-type locks 124, two bar-type locks 126, two thrust reverser position sensors 128, and four lock position sensors 132. One actuator assembly 104 (e.g., 104-2 and 104-5) per thrust reverser movable component 102 includes a latch-type lock 124 and a lock position sensor 132, and one actuator assembly 104 (e.g., 104-1 and 104-6) per thrust reverser movable component 102 includes a bar-type lock 126 and a lock position sensor 132. Moreover, the two actuator assemblies 104 that include the latch-type locks 124 each additionally include a thrust reverser position sensor 128 and a manual drive.

The latch-type locks 124 and the bar-type locks 126 are each motor (or solenoid)-actuated locks that are mechanically integrated with the associated actuator assemblies 104. The latch-type locks 124 each include a lock motor (or solenoid) and a spring-loaded latch that is configured to retain the associated actuator assembly 104-2, 104-5 in the stowed position. The bar-type locks 126 each include a lock motor (or solenoid) and a spring-loaded bar that is configured to block the actuator assembly drive shaft to retain the associated actuator assembly 104-1, 104-6 in the stowed position. The latch-type locks 124 and bar-type locks 126 are both configured to retain the associated actuator assemblies until the associated lock motor (or solenoid) is energized, and an overstow command is provided to unload the lock.

As may be appreciated, the lock position sensors 132 are preferably configured to sense the positions of the associated locks 124, 126. The lock position sensors 132 are further configured to supply lock position signals to an engine control 150. The lock position sensors may be variously configured and implemented to provide this functionality, but in the depicted embodiment each is implemented using a proximity sensor.

The thrust reverser position sensors 128 may also be variously configured and implemented, but in the depicted embodiment each is implemented using a transformer position sensor, such as a linear variable differential transformer (LVDT) or a rotary variable differential transformer (RVDT). Regardless of the specific implementation, one of the thrust reverser position sensors 128-1 is preferably a 3-channel device, and the other thrust reverser position sensors 128-2 is preferably a 2-channel device. Both of the thrust reverser position sensors 128 are coupled to the engine control 150, and each is configured to sense actuator assembly position and supply two channels of sensor signals to an aircraft engine control 150. The third channel of the 3-channel thrust reverser position sensor 128-1 supplies the sensor signals to the thrust reverser control 110. The reason for providing the sensor signals to the thrust reverser control 110 will be described further below.

Figure 2:
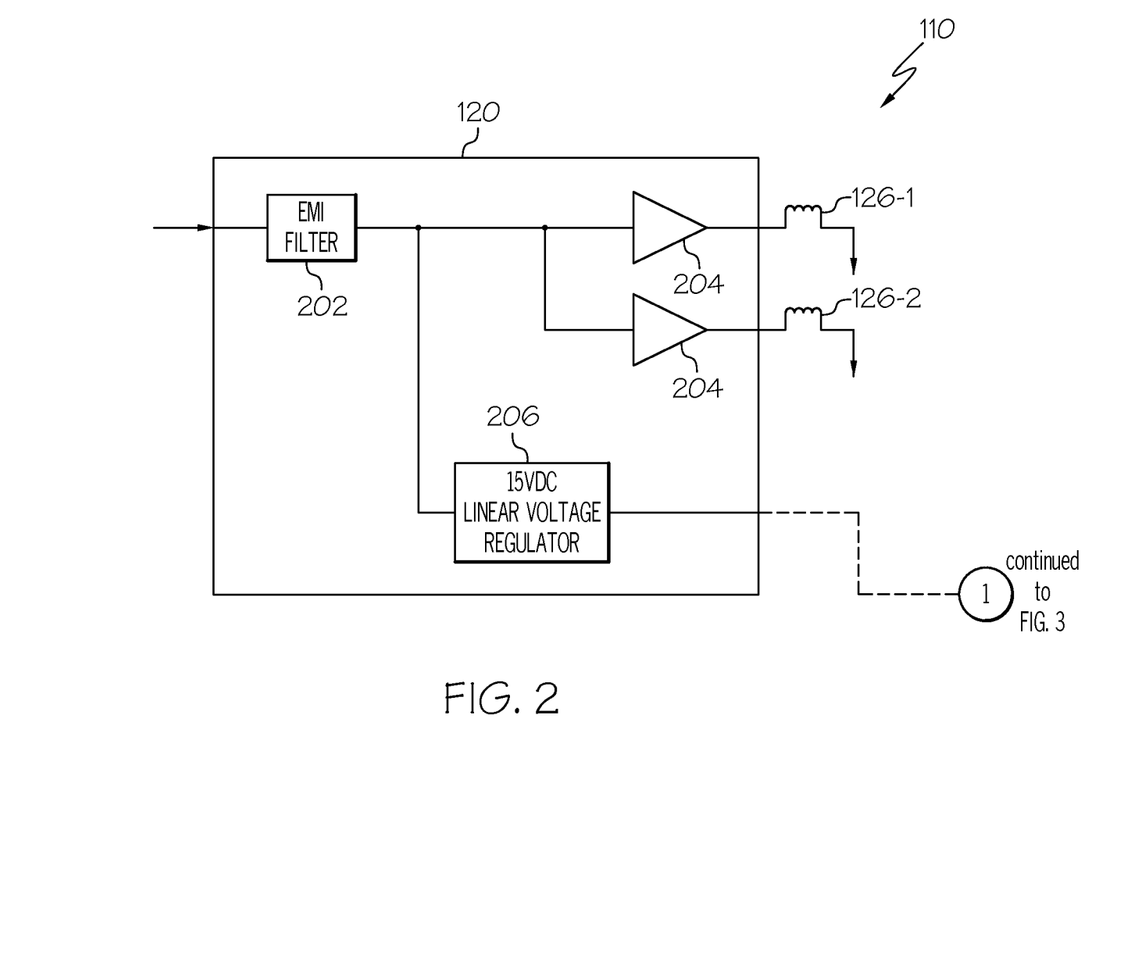
FIG. 2 depicts a functional block diagram of a portion of a thrust reverser control that may be used to implement the system of FIG. 1.

The thrust reverser control 110 is in operable communication with, and receives thrust reverser commands from, the engine control 150. In the depicted embodiment, the hydraulic isolation valve 118 also receives a system arming command from the engine control 150. The hydraulic isolation valve 118, upon receipt of this command, moves to an open position to allow hydraulic fluid to be supplied from, and returned to, the non-illustrated recirculating hydraulic fluid supply. The thrust reverser control 110 is configured, in response to the thrust reverser commands, to control the locks 124, 126 and the DCV 122 to thereby controllably move the thrust reverser movable components 102 between the stowed and deployed positions. Preferably, the thrust reverser control 110 is configured to implement snubbing control as the thrust reverser movable components 102 approach the fully deployed and fully stowed positions. Although the thrust reverser control 110 may be variously configured to implement its functionality, in the depicted embodiment it is implemented with a power splitter 120 and a DCV/latch lock controller 130. These functions are depicted in block diagram form in FIGS. 2 and 3, and with reference thereto will now be described.

The power splitter 120 (FIG. 2) and DCV/latch lock controller 130 (FIG. 3) are each powered by separate and isolated DC power sources. The power splitter receives DC power from the engine control 150 whenever the engine control 150 supplies deploy or stow commands. The power splitter 120 includes an EMI filter 202 and is configured, upon receipt of the DC power, to energize the two bar-type locks 126, via motor drivers 204. The motor drivers 204 include current limiting to limit the maximum current when the end of stroke is reached or if a stall condition occurs. The power splitter 120 also includes a DC voltage regulator 206 that is configured to supply a regulated DC voltage to the DCV/latch lock controller 130. This regulated DC voltage is used to power the electronic speed control circuitry within the DCV/latch lock controller 130. This is because the DCV/latch lock controller 130, which will now be described, is not energized during stow operations, but its electronic speed control circuitry still needs to be powered to perform the above-mentioned snubbing function.

Figure 3:
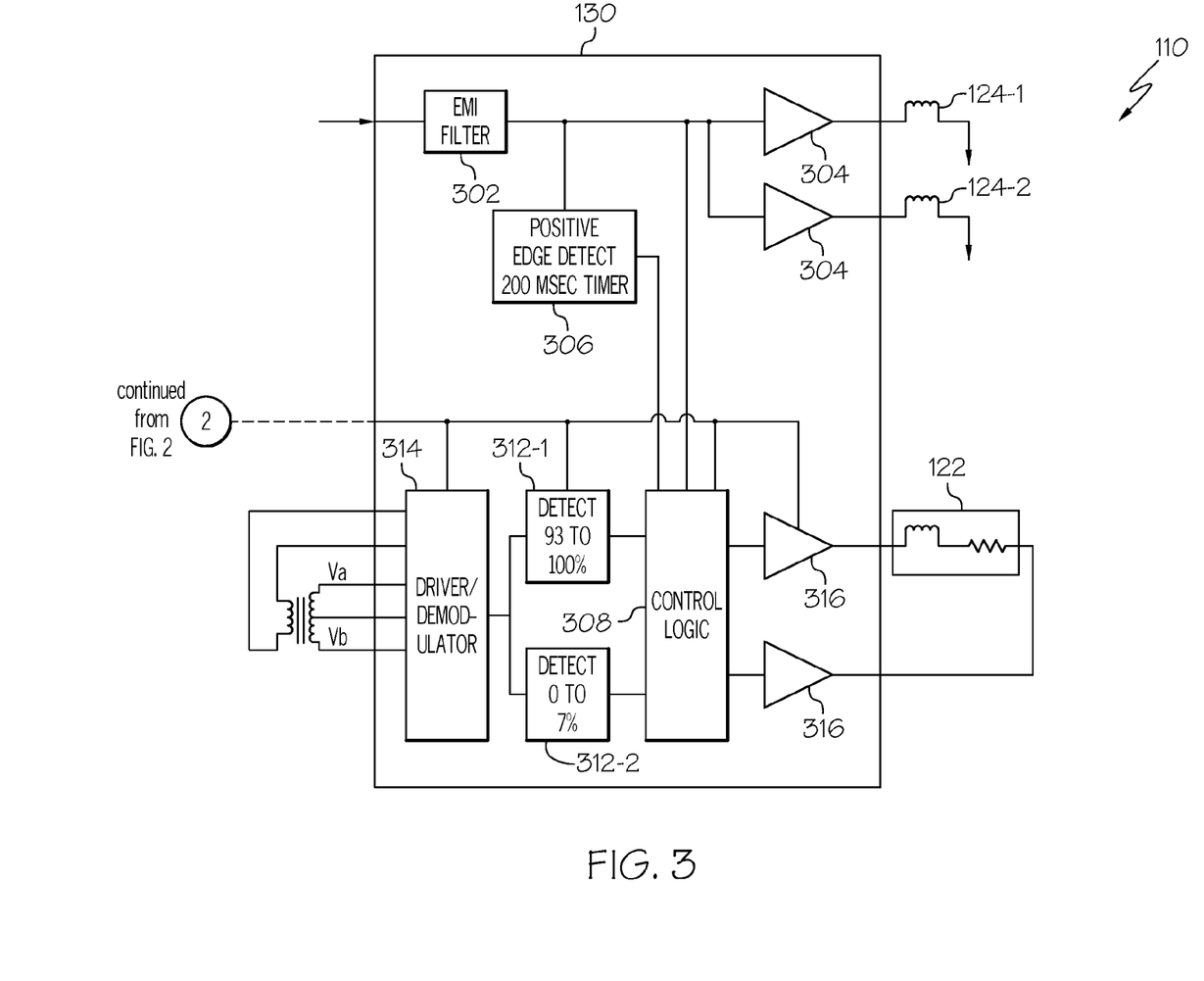
FIG. 3 depicts a functional block diagram of another portion of a thrust reverser control that may be used to implement the system of FIG. 1.

The DCV/latch lock controller 130 receives deploy and stow commands from the engine controller 150. In the depicted embodiment, deploy commands are implemented as DC power signals, and stow commands are implemented by the absence of DC power signals. The DCV/latch lock controller 130 also includes an EMI filter 302 and is configured, upon receipt of a deploy command, to energize the two actuator latch-type locks 124, via motor drivers 304. These motor drivers 304 also include current limiting to limit the maximum motor current when the end of stroke is reached or if a stall condition occurs.

The DCV/latch lock controller 130 additionally includes positive edge detection 306, control logic 308, two end-of-stroke detectors 312, a transformer position sensor driver/demodulator 314, and two current source amplifiers 316. The positive edge detection 306 is configured to distinguish between deploy and stow commands and translates these command into deploy logic level control signal commands.

The transformer position sensor driver/demodulator 314 drives the primary coil of the 3-channel transformer position sensor 128-1, and demodulates the secondary output to determine actuator assembly position. It should be noted that in the depicted embodiment, the 0% position is the full stow position and the 100% position is the full deploy position. The actuator assembly position that is determined by the transformer position sensor driver/demodulator 314 is supplied to the end-of-stroke detectors 312. One end-of-stroke detector 312-1 (referred to herein as a deploy end-of-stroke detector) detects when the actuator assembly 104 is between a first snubbing position and the fully deployed position. In the depicted embodiment, this corresponds to positions between the 93% and 100% positions. The other end-of-stroke detector 312-2 (referred to herein as the stow end-of-stroke detector) detects when the actuator assembly 104 is between the fully stowed position and a second snubbing position. In the depicted embodiment, this corresponds to positions between the 0% and 7% positions. The end-of-stroke detectors 312 supply a signal to the control logic 308 when the actuator assembly position is in the detected ranges. The reason for this will be described momentarily.

The current source amplifiers 316 are coupled to, and are configured to selectively energize, the DCV 122. The DCV 122 is configured, upon being energized with a predetermined maximum positive current, to direct hydraulic fluid to the rotary hydraulic motor 106 that causes the rotary hydraulic motor 106 to rotate, with full torque or speed (according to a typical torque versus speed characteristic whose end points are stall torque and freerun speed), in the deploy direction. Conversely, upon being energized with a predetermined maximum negative current, the DCV 122 is configured to direct hydraulic fluid to the rotary hydraulic motor 106 that causes the rotary hydraulic motor 106 to rotate, with full torque or speed, in the stow direction. At levels between the predetermined maximum currents, the torque or speed generated by the rotary hydraulic motor 106 is linearly proportional to current.

Figure 4:
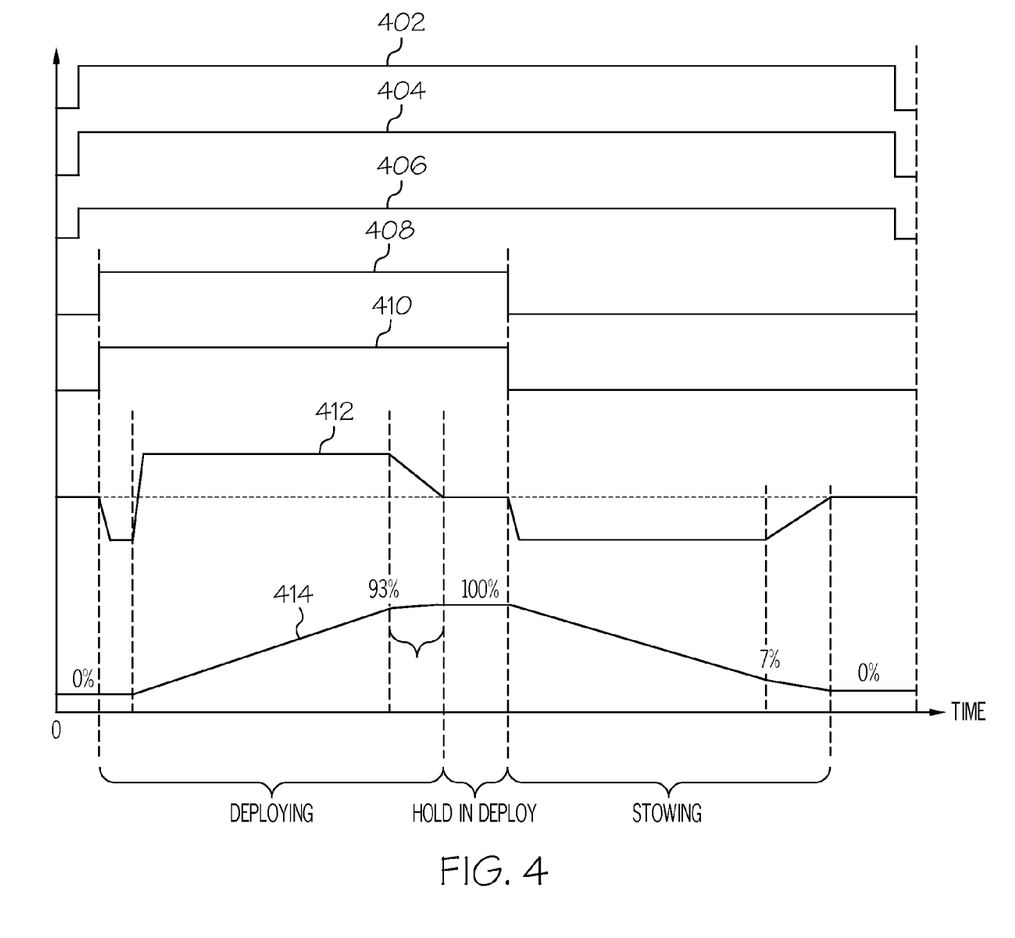
FIG. 4 is a graph depicting deploy and stow operations of the system of FIG. 1.

Referring now to FIG. 4, operation of the thrust reverser system 100 in response to a deploy command that is immediately followed by a stow command is graphically depicted, and will now be described. In doing so, it should be noted that the parenthetical reference numbers refer to like numbered graphical lines in FIG. 4.

Initially, upon receipt of the deploy command, the power splitter 120 is energized with DC power (402), the bar-type locks 126 are released (404), and regulated DC power is supplied to the DCV/latch lock controller 130 (406). When the deploy command is received by the DCV/latch lock controller 130 (408), the latch-type locks 124 are released (410), and the control logic 308 initially causes the DCV 122 to be supplied with the predetermined maximum negative current to provide a counter-torque to take load off of the locks 124, 126 to allow them to release (412). Thereafter, the control logic 308 causes the DCV 122 to be supplied with the predetermined maximum positive current to drive the actuator assemblies 104 in the deploy direction (412).

As the end-of-stroke detector 312-1 detects that the end-of-stroke is near (414), the control logic 308 implements the snubbing function by decreasing the current supplied to the DCV 122. That is, the current is gradually decreased from the predetermined maximum positive current down to zero current when the thrust reverser movable components 102 reach the fully-deployed position. The specific thrust reverser movable component position at which snubbing is initiated may vary. In one embodiment, snubbing begins when the 93% position is detected, and decreases the current to or near zero at the 100% (full deployed) position.

After a momentary hold in the deploy position during which time reverse thrust is applied to the aircraft, a stow command is supplied to the thrust reverser engine control 110 (408). As noted above, in the depicted embodiment this is equivalent to removing the deploy command. When this occurs, the control logic 308 in the DCV/latch lock controller 130 causes the DCV 122 to be supplied with the predetermined maximum negative current, which drives the actuator assemblies 104 in the stow direction (412). As the end-of-stroke detector 312-2 detects that the end-of-stroke is near (414), the control logic 308 again implements the snubbing function by decreasing the current supplied to the DCV 122. That is, the current is gradually decreased from the predetermined maximum negative current down to zero current when the thrust reverser movable components 102 reach the fully-stowed position. The specific thrust reverser movable component position at which snubbing is initiated may vary. In one embodiment, snubbing begins when the 7% position is detected, and decreases the current to or near zero at the 0% (full stowed) position. Regardless, after the stow position is reached, DC power is removed from the power splitter (402, 404, 406) which also causes the locks to engage and safely hold the reverser in the stowed position. The zero or "near zero" current condition as full stroke is achieved ensures a low and manageable impact speed and a positive stop engagement.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft thrust reverser actuation system, comprising:
 a plurality of non-hydraulic actuator assemblies, each non-hydraulic actuator assembly coupled to receive a drive torque and configured, upon receipt of the drive torque, to move to between a fully stowed and a fully deployed position;
 a rotary hydraulic motor coupled to each of the non-hydraulic actuator assemblies and adapted to selectively receive hydraulic fluid at a fluid flow rate and differential pressure, the rotary hydraulic motor configured, upon receipt of the hydraulic fluid, to rotate and supply the drive torque to each of the non-hydraulic actuator assemblies;

a control valve in fluid communication with the rotary hydraulic motor and adapted to receive electrical current at a magnitude, the control valve configured, upon receipt of the electrical current, to move to a valve position based on the magnitude, to thereby control the a direction and flow of hydraulic fluid to the hydraulic motor; and a valve control coupled to selectively receive thrust reverser commands and configured, upon receipt of the thrust reverser commands, to supply the electrical current to the control valve and to linearly decrease the electrical current from a predetermined maximum magnitude to zero when the non-hydraulic actuator assemblies are:

(i) translating toward the fully deployed position and are between a first snubbing position and the fully deployed position, and (ii) translating toward the fully stowed position and are between a second snubbing position and the fully stowed position.

2. The aircraft thrust reverser actuation system of claim 1, wherein the valve control is configured to supply the electrical current to the control valve at the predetermined maximum magnitude when the non-hydraulic actuator assemblies are translating toward (i) the fully deployed position and are between the fully stowed position and the first snubbing position and (ii) the fully stowed position and are between the fully deployed position and the second snubbing position.

3. The aircraft thrust reverser actuation system of claim 1, wherein the valve control comprises:

control logic coupled to selectively receive a first signal and a second signal, the control logic configured, upon receipt of either the first signal or the second signal, to vary the magnitude;

a deploy end-of-stroke detector configured to supply the first signal when the plurality of non-hydraulic actuator assemblies are between the first snubbing position and the fully deployed position; and a stow end-of-stroke detector configured to supply the second signal when the plurality of non-hydraulic actuator assemblies are between the second snubbing position and the fully stowed position.

4. The aircraft thrust reverser actuation system of claim 3, wherein the valve control further comprises:

a position sensor demodulator coupled to receive a sensor signal and configured, upon receipt the sensor signal, to (i) determine a position of the plurality of non-hydraulic actuator assemblies and (ii) supply a position signal representative of the position of the plurality of non-hydraulic actuator assemblies to the deploy end-of-stroke detector and the stow end-of-stroke detector.

5. The aircraft thrust reverser actuation system of claim 4, further comprising:

an actuator position sensor coupled to the position sensor demodulator, the actuator position sensor configured to sense the position of at least a portion of the plurality of non-hydraulic actuator assemblies and supply the sensor signal to the position sensor demodulator.

6. The aircraft thrust reverser actuation system of claim 1, further comprising:

a power splitter circuit coupled to selectively receive thrust reverser commands and configured, upon receipt of the thrust reverser commands, to selectively supply regulated DC voltage to the valve control.

7. The aircraft thrust reverser actuation system of claim 1, wherein each of the actuator assemblies is a non-hydraulic actuator assembly.

8. An aircraft thrust reverser system, comprising:

a plurality of non-hydraulic actuator assemblies, each non-hydraulic actuator assembly coupled to receive a drive torque and configured, upon receipt of the drive torque, to move to between a fully stowed and a fully deployed position;

a rotary hydraulic motor coupled to each of the non-hydraulic actuator assemblies and adapted to selectively receive hydraulic fluid at a fluid flow rate and differential pressure, the rotary hydraulic motor configured, upon receipt of the hydraulic fluid, to rotate and supply the drive torque to each of the non-hydraulic actuator assemblies;

a control valve in fluid communication with the rotary hydraulic motor and adapted to receive electrical current at a magnitude, the control valve configured, upon receipt of the electrical current, to move to a valve position based on, to thereby control the a direction and flow of hydraulic fluid to the hydraulic motor; and a valve control coupled to selectively receive thrust reverser commands and configured, upon receipt of the thrust reverser commands, to supply the electrical current to the control valve; and a power splitter circuit coupled to selectively receive thrust reverser commands and configured, upon receipt of the thrust reverser commands, to selectively supply regulated DC voltage to the valve control, wherein the valve control varies the magnitude linearly by decreasing the electrical current from a predetermined maximum magnitude to zero when the non-hydraulic actuator assemblies are:

(i) translating toward the fully deployed position and are between a first snubbing position and the fully deployed position, and (ii) translating toward the fully stowed position and are between a second snubbing position and the fully stowed position.

9. The aircraft thrust reverser actuation system of claim 8, wherein the valve control is configured to supply the electrical current to the control valve at the predetermined maximum magnitude when the non-hydraulic actuator assemblies are translating toward (i) the fully deployed position and are between the fully stowed position and the first snubbing position and (ii) the fully stowed position and are between the fully deployed position and the second snubbing position.

10. The aircraft thrust reverser actuation system of claim 8, wherein the valve control comprises:

control logic coupled to selectively receive a first signal and a second signal, the control logic configured, upon receipt of either the first signal or the second signal, to vary the magnitude of the electrical current;

a deploy end-of-stroke detector configured to supply the first signal when the plurality of non-hydraulic actuator assemblies are between the first snubbing position and the fully deployed position;

a stow end-of-stroke detector configured to supply the second signal when the plurality of non-hydraulic actuator assemblies are between the second snubbing position and the fully stowed position; and a position sensor demodulator coupled to receive a sensor signal and configured, upon receipt the sensor signal, to (i) determine a position of the plurality of non-hydraulic actuator assemblies and (ii) supply a position signal representative the position of the plurality of non-hydraulic actuator assemblies to the deploy end-of-stroke detector and the stow end-of-stroke detector.

11. The aircraft thrust reverser actuation system of claim 10, further comprising:
an actuator position sensor coupled to the position sensor demodulator, the actuator position sensor configured to sense a position of at least a portion of the plurality of non-hydraulic actuator assemblies and supply the sensor signal to the position sensor demodulator.

* * * * *